(12) United States Patent
Onoue et al.

(10) Patent No.: US 6,218,802 B1
(45) Date of Patent: Apr. 17, 2001

(54) ROBOT CONTROL UNIT

(75) Inventors: Kazuhiko Onoue, Kobe; Masataka Koyama, Hyogo-ken; Kazuhiro Abe, Kobe; Yoshimitsu Kurosaki, Kakogawa, all of (JP)

(73) Assignee: Kawasaki Jukogyo Kabushiki Kaisha, Hyogo-Ken (JP)

( * ) Notice: Subject to any disclaimer, the term of this patent is extended or adjusted under 35 U.S.C. 154(b) by 0 days.

(21) Appl. No.: 09/423,555

(22) PCT Filed: May 12, 1998

(86) PCT No.: PCT/JP98/02093

§ 371 Date: Nov. 10, 1999

§ 102(e) Date: Nov. 10, 1999

(87) PCT Pub. No.: WO98/51454

PCT Pub. Date: Nov. 19, 1998

(30) Foreign Application Priority Data

May 12, 1997 (JP) .................................................... 9-121346

(51) Int. Cl.[7] .......................................................... B25J 9/22
(52) U.S. Cl. .................... 318/568.13; 318/567; 318/569; 318/568.21; 901/15; 700/247
(58) Field of Search ..................................... 700/247, 259, 700/264, 245; 318/567, 569, 568.21, 568.13; 901/15, 3, 8

(56) References Cited

U.S. PATENT DOCUMENTS 5,086,401 * 2/1992 Glassman et al. .................... 700/247
5,856,844 * 1/1999 Batterman et al. ................... 700/247

FOREIGN PATENT DOCUMENTS

| 60-97409 | 5/1985 | (JP) . |
| 2-75005 | 3/1990 | (JP) . |
| 5-19841 | 1/1993 | (JP) . |
| 5-80836 | 4/1993 | (JP) . |
| 7-24631 | 1/1995 | (JP) . |
| 8-314524 | 11/1996 | (JP) . |

* cited by examiner

*Primary Examiner*—Karen Masih
(74) *Attorney, Agent, or Firm*—Oliff & Berridge, PLC

(57) ABSTRACT

A robot may be taught to perform a task by recording information regarding the positions and attitudes of the joints of the robot body as it performs the task. When this information is subsequently replayed, the robot performs the task in the manner as taught. In particular, the robot may be taught either by an operator situated near the robot body or by an operator situated at a remote location. At the remote location, the robot may be taught by an operator even though the operator cannot see the robot body. More particularly, at the remote location, information regarding the current position and attitude of the joints of the robot body is displayed to the operator, and the operator may adjust this information in order to control the movement of the robot body. As a safety measure, when an operator is located near the robot body, only an operator situated near the robot body can control the robot body.

20 Claims, 10 Drawing Sheets

ROBOT PROGRAM(INSIDE OF MEMORY RAM)

OPERATING PROGRAM

PROGRAM A

STEP1   OPERATION   VALUES OF JOINTS1
STEP2   OPERATION   VALUES OF JOINTS2
STEP3   OPERATION   VALUES OF JOINTS3
STEP4   OPERATION   VALUES OF JOINTS4

ROBOT CONTROL UNIT

BACKGROUND OF THE INVENTION

1. Field of the Invention

This invention relates to a robot control unit with which a user can easily make teaching data for a robot body having a plurality of joints.

2. Description of the Related Art

A typical conventional prior art is shown in FIG. 10. A robot body 110 having a plurality of joints is connected to a robot control unit 120 through a electric signal line 111. A teach-inputting means 130, which is called a teaching pendant or the like, is connected to the robot control unit 120 through a bendable electric signal line 121. By operating the teach-inputting means 130, teaching data for positions of the plurality of joints are inputted, while the robot body 110 actually moves. The inputted teaching data are replayed by the robot control unit 120 to drive each of the joints of the robot body 110. The control unit 120 may have displaying means 122 such as a cathode-ray tube screen, for displaying the inputted teaching data and information of moving states of the robot body 110.

The robot control unit 120 may have a choosing switch 140. As shown in FIG. 10A, the choosing switch 140 has a knob 141, which an operator turns for choosing one from teaching operation mode by the teach-inputting means 130 and replaying operation mode for the robot body 110 using the teaching data.

FIG. 11 is a block diagram showing a electrical structure of the prior art shown in FIG. 10. The robot control unit 120 is constructed in such a manner that processing means 150 and a servo unit 160 are accommodated in one housing.

FIG. 12 a flow chart for explaining a general operation of the prior art shown in FIGS. 10 and 11. As shown in the FIG. 12, at a step a1, a power supply is given to the robot control unit, and the teaching operation mode where a teaching operation can be executed is chosen by turning the knob 141 of the choosing switch 140. The choosing switch 140 is connected to a processing circuit 151 which can be materialized by a microcomputer in the processing means 150. The replaying operation for the robot body 110 is prohibited in a step a2.

At a step a3, a key-input panel 131 of the teach-inputting means 130 is operated. Then, the operation is detected by a processing circuit 132 of a microcomputer. Then, information about the teaching data is displayed by the displaying means 133 which can be materialized by a liquid crystal screen, and is temporarily stored in a memory 134. Then, the information is stored in a memory 152 in the processing means 150 through a line 121. Operating data of the processing circuit 151 are stored in a read-only-memory 153. Following the inputted teaching data, a processing circuit 161 of a microcomputer in a servo unit 160 executes programs stored in a read-only-memory 162 to temporarily store the teaching data in a memory 163. Thus, a driver 164 is controlled so that the positions of the joints are consistent with the inputted positions. A power output circuit 165 drives a motor 112 in the robot body 110 through a electric signal line 111. The positions of the joints are detected by encoders 113 and transmitted to the processing circuit 161, so that the joints are driven following the teach-inputting operation. During the teach-inputting operation, the robot body 110 actually moves and the operator can confirm the moving state of the robot body 110 by his eyes.

At a step a4, the operator confirms completion of the teach-inputting operation. At a step a5, the replaying operation mode where the replaying operation can be executed is chosen by turning the knob 141 of the choosing switch 140. Thus, the processing circuit 151 in the processing means 150 reads out the teaching data from the memory for teaching data 152. Then, the servo unit 160 operates the robot body 110 at a step a6.

Teaching data can be made by a personal computer at a remote place from which the operator can not see the robot body. A storage device such as a floppy disk storing the teaching data can be removably set in the data inputting means 154 of the processing means 150. The teaching data in the storage device are transmitted to the memory for teaching data 152. The servo unit 160 replays the operation of the robot body 110 following the teaching data stored in the storage device, when the choosing switch 140 is set for the replaying operation mode.

As shown in FIGS. 10 to 12, the robot control unit 120 and the teach-inputting means 130 are disposed near the robot body 110, that is, near the real-operating site. Thus, at a remote place, the teaching data can not be made while the operator confirms the movement of the robot body 110, when the robot body 110 actually moves.

The teaching data stored in the storage device which can be set in the data inputting means 154 are made at a remote place. However, the teaching data are not made while the operator confirms the movement of the robot body 110 when the robot body 110 actually moves. Thus, the teaching data stored in the storage device may include a wrong teaching data which may bring a risk.

Thus, according to the prior art, the teach-inputting operation has to be executed near the robot body 110 when the operator wants to confirm the movement of the robot body 110 during the teach-inputting operation. The real-operating site where the robot body 110 is disposed, for example a factory, may be environmentally polluted by a welding operation or the like, and may be dangerous for the operator. Thus, safety measures for the operator are not assured.

FIG. 13 is a schematic perspective view showing a structure of another prior art. In the structure, the electric signal line 111 is relatively long, so that the robot control means 120 is disposed at a safer place, which is away from the real-operating site where the robot body 110 is disposed. The robot control means 120 is connected to the teach-inputting means 157 which can be materialized by a personal computer, through the electric signal line 156.

The robot body 110 and the robot control means 120 are constituted in the same manner as shown in FIGS. 10 to 12. The processing circuit 151 in the processing means 150 is connected to the personal computer 157 through the line 156. The personal computer 157 has a key-input means and a liquid crystal panel for showing teaching data inputted by the key-input means. The structure is not provided with means similar to teach-inputting means 130 of the previous prior art.

In the case of the prior art shown in FIG. 13, the personal computer 157 for inputting the teaching data can be disposed at a place away from the real-operating site where the robot body 110 is disposed. Thus, the safety for the operator is assured. Then, the operator can watch the replaying robot body 110 at the safer place.

A disadvantage of the prior art shown in FIG. 13 is that the robot body 110 does not actually move following the teaching data when the teaching data are inputted via the personal computer 157. The operator transmits the teaching data made by the personal computer 157 into the memory for teaching data 152 provided in the processing means 150 of the robot control means 120 through the electric signal line 156. The servo unit 160 replays the moving operation for the robot body 110, following the teaching data stored in the memory for teaching data 152. Thus, the operator tends to make an error in inputting the teaching data.

In addition, according to the prior art shown in FIG. 13, the electric signal line 111 connecting the robot body 110 with the robot control means 120 can not be more than 20 meters because of electrical resistance thereof.

SUMMARY OF THE INVENTION

Therefore, the object of this invention is to provide a robot control unit with which the operator can input teaching data safely, and which prevents the operator from making an error in the teaching data.

This invention is a robot control unit for controlling a robot body with a plurality of joints. The robot control unit includes a servo unit for driving the joints of the robot body. A first teach-inputting means is disposed at a nearby place where an operator can directly see the robot body, and can make teaching data for positions of the joints of the robot body. Additionally, a second teach-inputting means is disposed at a remote location where an operator cannot directly see the robot body. At the second location the operator can make teaching data for positions of the joints of the robot body. The control unit also includes choosing means connected to the first teach-inputting means and the second teach-inputting means, for choosing the teaching data made by either the first teach-inputting means or the second teach-inputting means. Furthermore, a controlling means is connected to the choosing means and the servo unit, having a memory for teaching data, for transmitting the teaching data chosen by the choosing means to the servo unit as an instruction signal, and for causing the teaching data to be stored in the memory for teaching data.

According to this feature, the first teach-inputting means is near the robot body, the second teach-inputting means is disposed at a remote location, and the controlling means transmits inputted teaching data to the servo unit as the instruction signal to drive the robot body during the teach-inputting operation with the first and second teach-inputting means.

An operator situated at the remote location can operate the second teach-inputting means. The remote location is not at the environmentally polluted real-operating site where the robot body is disposed. Thus, the safe operation is assured. Preferably, another operator at a place near the first teach-inputting means can visually confirm the movement of the robot body during the teach-inputting operation. Alternatively, a robot body displaying means, which is explained below, can display the positions of the joints of the robot body or attitudes thereof to the operator of the second teach-inputting means in a visual manner.

In addition, the choosing means can be disposed near the robot body, and the choosing means can choose either the first teach-inputting means or the second teach-inputting. This prevents the robot body from being operated with the second teach-inputting means by the operator at the location remote from the robot body when there is another operator near the robot body. This can reduce the risk of injury to the operator. For example, the choosing means disposed near the robot body might be set to a mode of operation where teach-inputting operation can be executed with the first teach-inputting means, when there is another operator near the robot body.

Another feature of the invention is that the robot control unit further comprises robot body displaying means which display the positions of the joints of the robot body preferably near the second teach-inputting means.

According to this feature, the operator for the second teach-inputting means can recognize the positions of the joints of the robot body and the attitudes thereof which are displayed by the robot body displaying means. For example, the robot displaying means can display this information in a visual manner or an auditory manner. Thus, the operator for the second teach-inputting means can execute the teach-inputting operation while confirming the teach-inputting data, so that it is assured to eliminate errors in inputting the teaching data.

Another feature of the invention is that the robot body displaying means can calculate driven and controlled positions of the joints of the robot body following the teaching data chosen by the choosing means, and display the calculated positions. Preferably, the chosen teaching data is the teaching data made with the second teach-inputting means.

According to this feature, the operator for the second teach-inputting means can confirm the positions of the joints of the robot body, by the calculated and displayed positions of the joints of the robot body following the teaching data made with the second teach-inputting means.

Another feature of the invention is that the robot body displaying means has detecting means disposed at a nearby place, for detecting the positions of the joints of the robot body, preferably for taking an image of the robot body.

According to this feature, taking means such as a television camera including a CCD (charge coupled device) are disposed near the robot body to take an image of the robot body. The image signals are displayed by the displaying means disposed at a place near the second teach-inputting means. Thus, the operator for the second teach-inputting means can execute the teach-inputting operation while confirming the positions of the joints of the robot body, so that it is assured to eliminate errors in inputting the teaching data.

Another feature of the invention is that the controlling means does not transmit the teaching data signal made with the second teach-inputting means to the servo unit, but causes the teaching data to be stored in memory for teaching data.

In this case, the joints of the robot body can remain motionless while the teach-inputting operation is executed with the second teach-inputting means.

Another feature of the invention is that the second teach-inputting means has input-operating means for inputting the teaching data. In addition, the invention includes displaying means for displaying in a visual manner. Additionally, the invention includes teach-input processing circuitry for transmitting the teaching data inputted by the teach-operating means, and for causing the displaying means to display information about the teaching data inputted by the input-operating means. The controlling means has a robot-control processing circuit for causing the teaching data from the controlling means for teach-inputting to be stored in the memory for teaching data, for reading out the teaching data stored in the memory for teaching data, and for transmitting the read teaching data to the servo unit as the instruction data.

According to the invention, the teaching data inputted by the second input-operating means is transmitted from the teach-input processing circuit to the robot-control processing circuit in the controlling means. The input-operating means can be realized by key-inputting means or displaying means. The input-operating means can be realized using a mouse which can be clicked on switch images for the teach-inputting operation. The teach-input processing circuit can be realized by a microcomputer. The teach-input processing circuit causes the displaying means to display information about the teaching data inputted by the input-operating means in a visual manner, which information can be such as the teaching data itself, i.e., the data representing the positions of the joints of the robot or a perspective view of the robot body after the positions of the joints are displaced following the teaching data.

Another feature of the invention is that the second teach-inputting means is realized by a personal computer, and that the robot-control processing circuit is realized in a circuit board which can be set in the personal computer via a removal bus.

According to the invention, the second teach-inputting means can be realized by an off-the-shelf personal computer. The robot-control processing circuit is formed in the circuit board and connected to the connector provided in a housing of the personal computer in a bus-connection manner. The robot-control processing circuit can be separately provided for each of the plural robot bodies. The displaying means of the second teach-inputting means can display the positions of the joints of the robot body obtained by processing the teaching data as a perspective view, as the information about the teaching data. The displaying means can also display the image signals of the robot body taken by the taking means.

Another feature of the invention is that the servo unit is disposed as a nearby place, and that the servo unit and the robot-control processing circuit are connected with each other via an optical fiber.

According to the invention, the servo unit for controlling actuators such as motors driving the joints of the robot body is disposed near the robot body, i.e., at the real-operating site. The servo unit is connected to the robot-control processing circuit disposed at the remote place via the optical fiber. By using the optical fiber, the original signals can be transmitted and received over 2 km. Thus, the teaching data for the robot body can be made at an office which is remote from real-operating site where the robot body is disposed.

The teach-inputting means can have a mouse which can be clicked, a mouse input displaying means, having a screen showing a joint-designating area representing the plural joints of the robot body in a record area. By operating the mouse, a cursor in the screen is displayed into the joint-designating area or into the record area. Teaching data (raw data) are outputted in such a manner that the corresponding joint of the robot body shifts by a predetermined shifting unit every clicking of the mouse when the cursor is in the joint-designating area. The teaching data made before clicking of the mouse when the cursor is in the record area are outputted at the clicking of the mouse when the cursor is in the record area.

According to this feature, in the teach-inputting means for inputting the teaching data, when the cursor is displaced into the joint-designating area displayed by the mouse input displaying means and then the mouse is clicked, the joint of the robot body corresponding to the joint-designating area shifts in a selected direction by a predetermined shifting unit every clicking of the mouse. Then, the inputting operation with the teach-inputting means is made easier than with the keyboard or the like. A multiple of the predetermined shifting unit can be set as a shifting value, corresponding to the time while the cursor stays at the joint-designating area and the mouse remains clicked. After the shifting value as the teaching data is inputted, the cursor is displaced into the record area. Then the mouse is clicked to output the teaching data from the mouse input displaying means, so that the teaching data are stored in the memory for teaching data provided in the robot-control processing circuit.

BRIEF DESCRIPTION OF THE DRAWINGS

FIG. 1A is an enlargement of the choosing switch shown in FIG. 1;

BEST MODE FOR CARRYING OUT THE INVENTION

Figure 1:
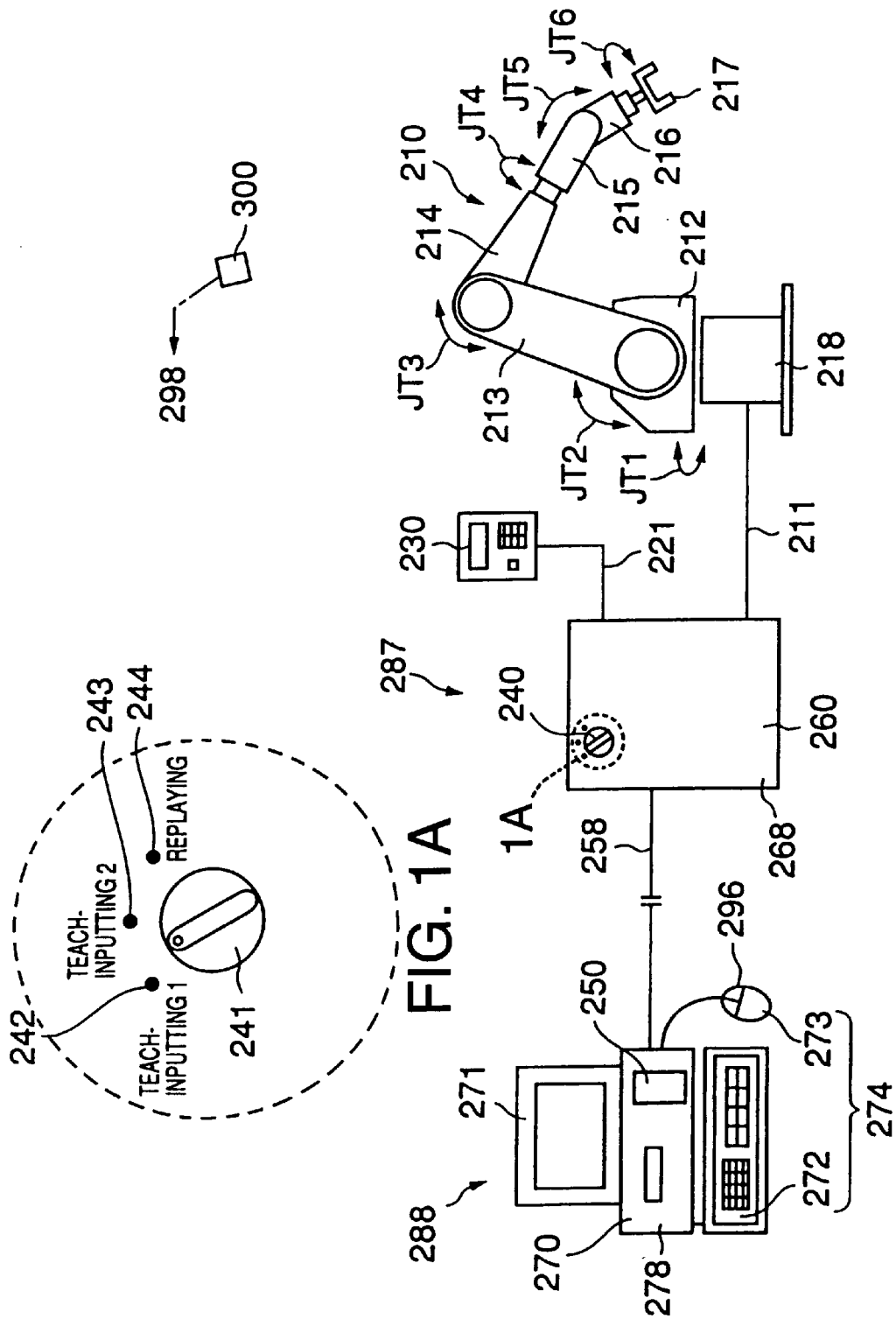
FIG. 1 is an entire schematic view of an embodiment of the robot control unit of the invention.
Figure 2:
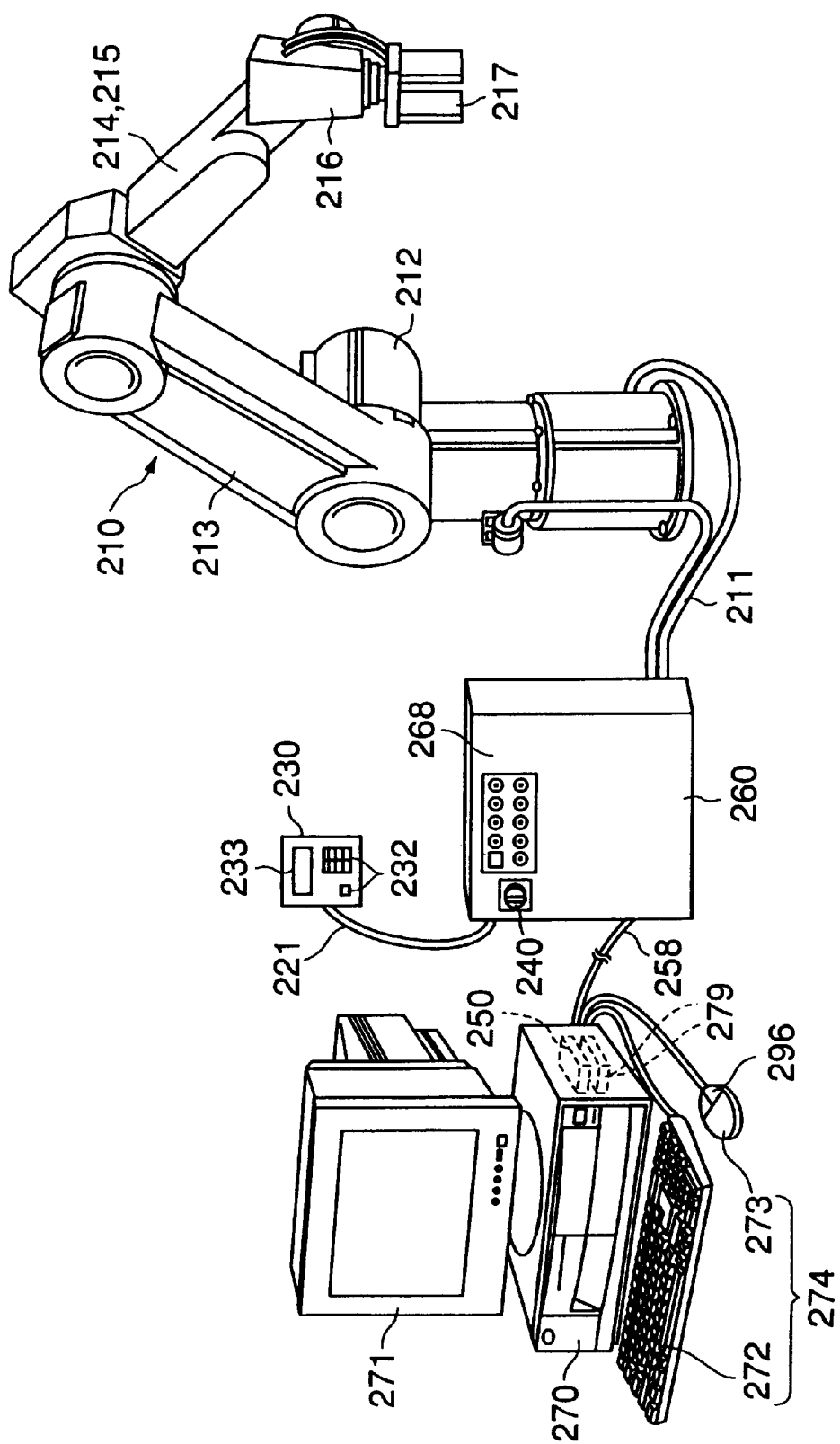
FIG. 2 is a schematic perspective view of the robot control unit shown in FIG. 1.

FIG. 1 is an entire schematic view of an embodiment of the robot control unit of the invention. FIG. 2 is a schematic perspective view of the robot control unit shown in FIG. 1. A robot body 210, which has plural of (six in this embodiment) joints, is connected to a servo unit 260 through a electric signal line 211. The servo unit 260 is connected to first teach-inputting means 230, which is called a teaching pendant, through a bendable electric signal line 221. A choosing switch 240 (choosing means) is mounted on a housing 268 of the servo unit 260. The first teach-inputting means 230 and the servo unit 260 are disposed at a neighboring place where an operator can see the robot body 210 directly i.e. at a real-operating site. The operator at the real-operating site can input teaching data while operating the robot body 210.

The servo unit 260 is connected to controlling means 250 disposed at a remote place 288, through an optical fiber 258. The controlling means 250 is materialized by a board mounted in a circuit base. The controlling means 250 is set in a housing 278 of a personal computer which materializes second teach-inputting means 270.

The robot body 210 comprises: a basic pedestal 218 disposed at a fixed position in the real-operating site where welding operations or the like are executed; and a rotatable pedestal 212 disposed on the basic pedestal 218. The rotatable pedestal 212 is rotatable around a first joint JT1. An arm 213 is mounted at the rotatable pedestal 212 in such a manner that the arm 213 can pivot around a second joint JT2. Another arm 214 is mounted at the arm 213 in such a manner that the arm 214 can pivot around a third joint JT3. Another arm 215 is mounted at the arm 214 in such a manner that the arm 215 can pivot around a fourth joint JT4. Another arm 216 is mounted at the arm 215 in such a manner that the arm 216 can pivot around a fifth joint JT5. A wrist 217 is mounted at the arm 216 in such a manner that the wrist 217 can pivot around a sixth joint JT6.

Figure 3:
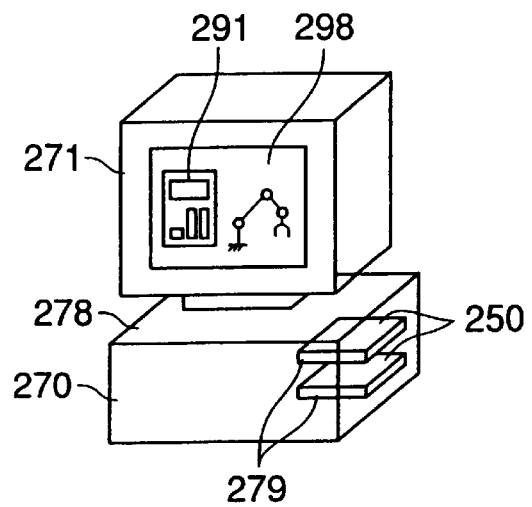
FIG. 3 is a perspective view of the second teach-inputting means 270.

FIG. 3 is a perspective view of the second teach-inputting means 270. The controlling means 250 materialized by the circuit board is set in the housing 278 as described above, and is connected thereto via one or more removable connectors 279 in a bus-connection manner.

The second teach-inputting means 270 shown in FIG. 3 include: displaying means 271 (robot displaying means) which is materialized by a liquid crystal screen, a cathode-ray tube screen or the like; key-inputting means 272 which is a keyboard; and a mouse 273. The displaying means 271 displays information for input operations. The key-inputting means 272, the displaying means 271 and the mouse 273 constitute teach-inputting means 274.

Figure 4:
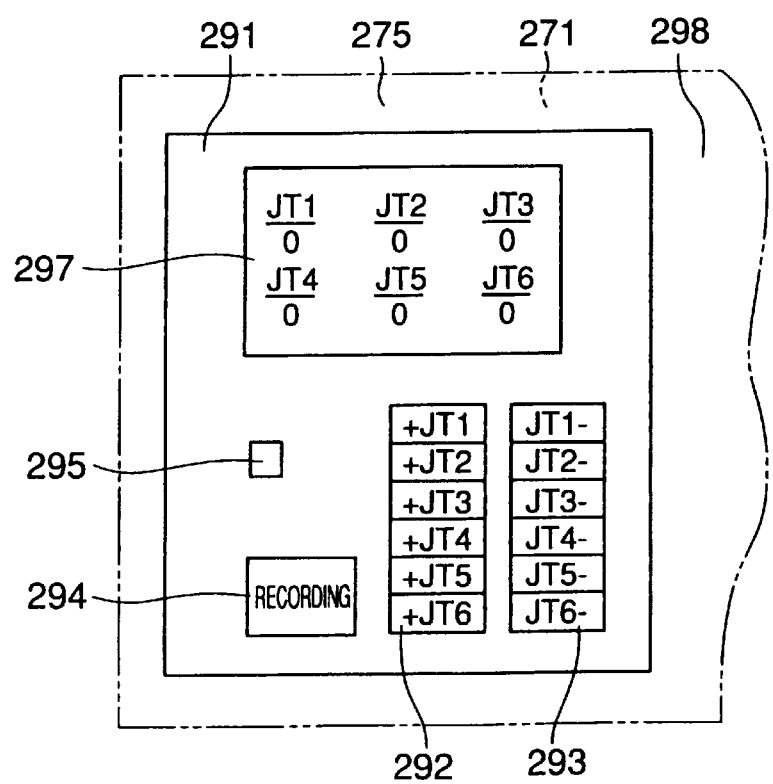
FIG. 4 is a front view of a partial displaying state of one screen of the displaying means 271.

FIG. 4 is a front view of a partial displaying state of one screen 275 of the displaying means 271. The screen 275 of the displaying means 271 displays a displayed area for inputting 291 (mouse input displaying means) where click operations to the mouse 273 can be executed. The displayed area for inputting 291 include joint-designating areas 292, 293 for increasing or decreasing the pivoting values (positions) of the joints JT1 to JT6 of the robot body 210, and a record area 294 for inputting teaching data. A cursor 295 can be moved in the displayed area for inputting 291 following the mouse 273. When the cursor 295 is displaced into a [+JT1] area of the joint-designating area 292 and then a click switch 296 of the mouse 273 is clicked, the pivoting value of the first joint JT1 of the robot body 210 corresponding to the [+JT1] area of the joint-designating area 292 is increased by a predetermined shifting unit, every clicking in the [+JT1] area. When the cursor 295 is displaced into a [−JT1] area of the joint-designating area 292 and then the click switch 296 is clicked, the pivoting value of the first joint JT1 is decreased by a predetermined shifting unit.

The pivoting values of the joints JT1 to JT6 are respectively displayed at a displayed area for pivoting value 297 in a visual manner. After the pivoting value of the first joint JT1 is set, the cursor 295 is displaced into the record area 294 and then the click switch 296 is clicked. Thus, the teaching data are inputted in such a manner that the teaching data represent the pivoting value of the first joint JT1 inputted by the click operations before the click operation in the record area 294. While the cursor 295 stays at the [+JT1] area of the joint-designating area 292 and the click switch 296 remains clicked, the pivoting value of the first joint JT1 can be increased by the predetermined shifting unit, every timer-set time in succession. While the cursor 295 stays at the [−JT1] area of the joint-designating area 292 and the click switch 296 remains clicked, the pivoting value of the first joint JT1 can be decreased by the predetermined shifting unit, every timer-set time in succession.

In addition to the displayed area for inputting 291, there is also a displayed area for robot body 298 for showing movements of the joints JT1 to JT6 of the robot body 210, in the screen 275 of the displaying means 271. The displayed area for robot body 298 is arranged at an adjacent right area of the displayed area for inputting 291. The robot body displaying area 298 displays the positions and attitudes of the joints JT1 to JT6 of the robot body.

Figure 5:
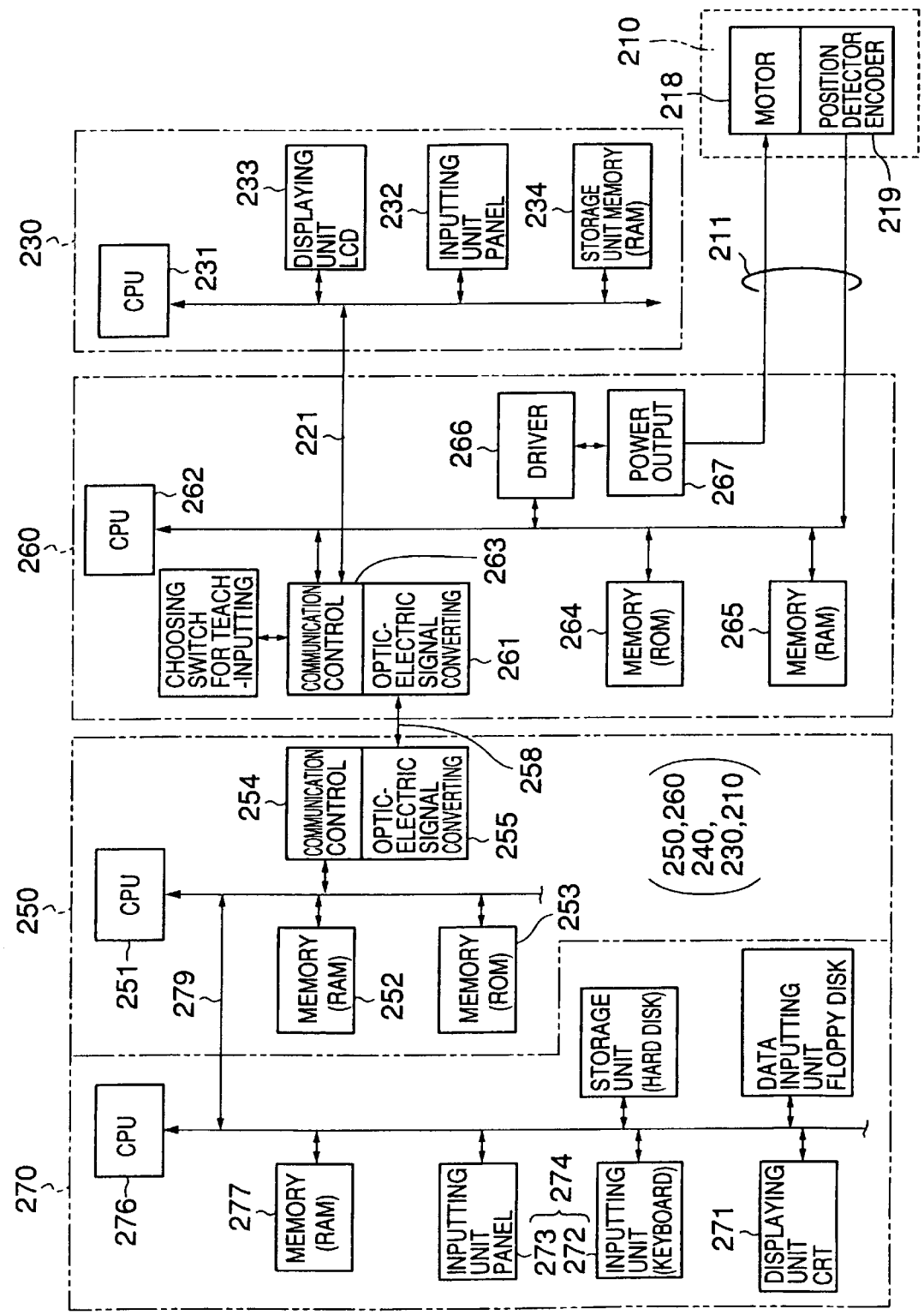
FIG. 5 is a block diagram showing an electrical structure of the embodiment shown in FIGS. 1 to 4.

FIG. 5 is a block diagram showing an electrical structure of the embodiment shown in FIGS. 1 to 4. In the second teach-inputting means 270, a processing circuit 276 materialized by a microcomputer is connected to a random-access-memory 277 as well as the displaying means 271 and the teach-inputting means 274. Teaching data are inputted by using the key-inputting means 272 such as a keyboard or by using the displayed area for inputting 291 in the displaying means 271 and the mouse 273. The teaching data are stored in the memory 277 and transmitted to a processing circuit 251 in the controlling means 250 through a bus-line including the connectors 279 by the processing circuit 276. The processing circuit 251 may be materialized by a microcomputer or the like. The teaching data are then stored in a memory for teaching data 252 such as a random-access-memory. Programs for driving the processing circuit 251 are stored in a read-only-memory 253.

In the controlling means 250, the processing circuit 251 is also connected to communication controlling means 254. Thus, optic-electric signal converting means 255 may convert electric signals of the teaching data stored in the memory for teaching data 252 into optic signals, and the optic signals are transmitted to optic-electric signal converting means 261 in the servo unit 260 via an optical fiber 258. Some lines for signals are omitted in the specification and the drawings.

A processing circuit 262, which is materialized by a microcomputer, in the servo unit 260 is connected to communication controlling means 263. The optic signals of the teaching data from the optic-electric signal converting means 261 are received by the processing circuit 262 via the communication controlling means 263. Following programs stored in a read-only-memory 264, the processing circuit 262 causes the teaching data received as described above to be temporarily stored in a random-access-memory 265. Then, the processing circuit 262 processes and calculates the teaching data and controls a driver 266 to control electric powers. Thus, power output means 267 drives motors 218 of the joints JT1 to JT6 of the robot body 210. The pivoting positions and velocities of the joints JT1 to JT6 are detected by encoders 219 as detecting means or by a television camera 300 as taking means, and are transmitted to the processing circuit 262. Thus, the teaching data stored in the memory for teaching data 252 for the joints JT1 to JT6 respectively, which data can be for teaching mode or for replaying mode, are transmitted to the servo unit 260 as instruction signals via the optical fiber 258 to drive the motors 218 of the robot body 210 respectively.

The first teach-inputting means 230 include: a processing circuit 231 materialized by a microcomputer, a key-inputting means 232 connected thereto, liquid-crystal displaying means 233 and a random-access-memory 234. An operator can hold the teach-inputting means 230 with his one hand and can operate the key-inputting means 232 with his fingers of his other hand to input teaching data. The key-inputting means 232 has push-button switches, which correspond to the joint-designating areas 292, 293 and the record area 294 as described above with reference to FIG. 4. The displaying means 233 display inputted pivoting values of the joints JT1 to JT6, in substantially the same manner as the displayed area 297 shown in FIG. 4. The teaching data inputted by the key-inputting means 232 are stored in the memory 234 and transmitted to the communication controlling means 263 in the servo unit 260 through a line 221 by the processing circuit 231. The teaching data from the communication controlling means 263 are then converted into optic signals by the optic-electric signal converting means 261, and transmitted to the optic-electric signal converting means 255 via the optical fiber 258. The teaching data are then converted back into electric signals by the optic-electric signal converting means 255, and stored in the memory for teaching data 252 through the communication controlling means 254 in the controlling means 250 by the processing circuit 251. The operator can operate the key-inputting means 232 at the neighboring place where the robot body 210 is disposed i.e. at the real-operating site. Then the joints JT1 to JT6 of the robot body 210 can respectively pivot following the inputted pivoting values. That is, the operator can confirm the movement of the robot body 210 while inputting the teaching data. As the first teach-inputting means 230 is connected to the servo unit 260 via the bendable line 221, the operator can move around the robot body 210 to carefully confirm the movement thereof while inputting the teaching data.

As shown in FIG. 1, a choosing switch 240 has a knob for operating 241 which the operator can turn. By turning the knob for operating 241, the operator can choose exclusively one mode from first-teaching mode 242 where the teaching operation can be executed with the first teach-inputting means 230, second-teaching mode 243 where the teaching operation can be executed with the second teach-inputting means 270, and replaying mode 244 where the teaching data stored in the memory for teaching data 252 in the first-teaching mode 242 and/or the second-teaching mode 243 are replayed. In the first-teaching mode 242, the teaching operation using the first teach-inputting means 230 is allowed, but the teaching operation using the second teach-inputting means 270 is forbidden. In the second-teaching mode 243, the teaching operation using the first teach-inputting means 230 is forbidden, but the teaching operation using the second teach-inputting means 270 is allowed. The operator at the neighboring place of the robot body 210 can choose and set the first-teaching mode 242 by turning the knob for operating 241, because the knob for operating 241 is disposed at the neighboring place of the robot body 210. This prevents movements of the joints JT1 to JT6 following operations with the second teach-inputting means 270, so that the safety for the operator is assured.

An output from the choosing switch 240 is transmitted to the processing circuit 251 through the communication controlling means 263, the optical fiber 258 and the communication controlling means 254. The processing circuit 251 switches the operational mode in response to the output from the choosing switch 240.

Figures 6, 7:
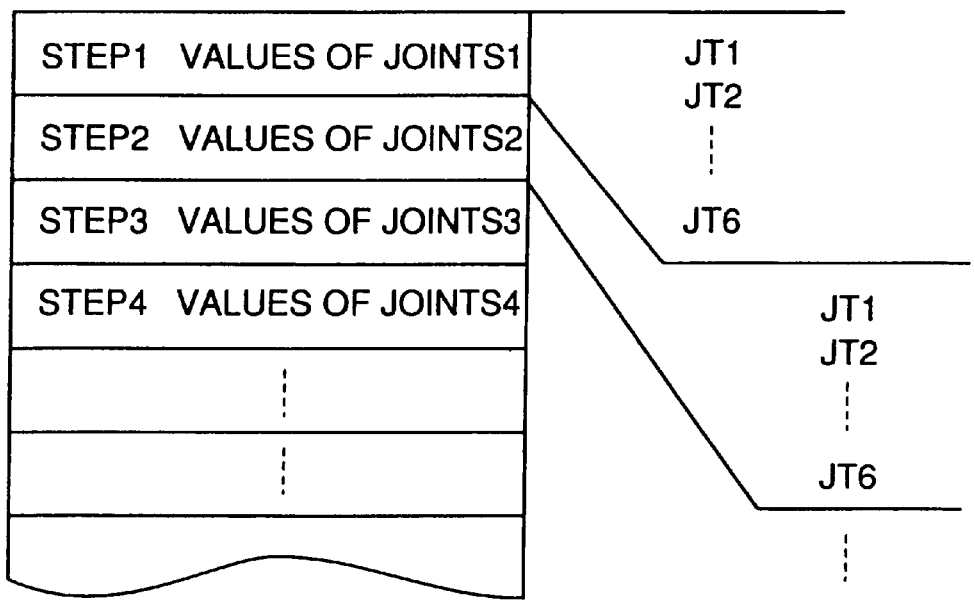
FIG. 6 is a view for explaining contents stored in the memory for teaching data 252 provided in the controlling means 250.
FIG. 7 is a view for explaining an operation of the robot body 210 in the replaying mode 244.

FIG. 6 is a view for explaining contents stored in the memory for teaching data 252 provided in the controlling means 250. The pivoting values (positions) of the joints JT1 to JT6 are stored respectively, correspondingly to each of operating steps 1, 2, 3, 4, . . . of the robot body 210, as shown with the numerical signs 1, 2, 3, 4.

FIG. 7 is a view for explaining an operation of the robot body 210 in the replaying mode 244. The processing circuit 251 in the controlling means 250 reads out the teaching data from the memory for teaching data 252. That is, the processing circuit 251 reads out the pivoting values 1, 2, 3, 4, . . . of the joints JT1 to JT6 for step 1, for step 2, for step 3, and for step 4 . . . as described above with reference to FIG. 6. The teaching data are transmitted to the optic-electric signal converting means 255 through the communication controlling means 254. The teaching data are then converted into optic signals by the optic-electric signal converting means 255, and transmitted to the optic-electric signal converting means 261 via the optical fiber 258. The teaching data are then converted back into electric signals by the optic-electric signal converting means 261, and transmitted to the processing circuit 262 through the communication controlling means 263. The processing circuit 262 processes and calculates the teaching data and drives and controls the motors 218 of the robot body 210 in a servo-driving manner.

Figure 8:
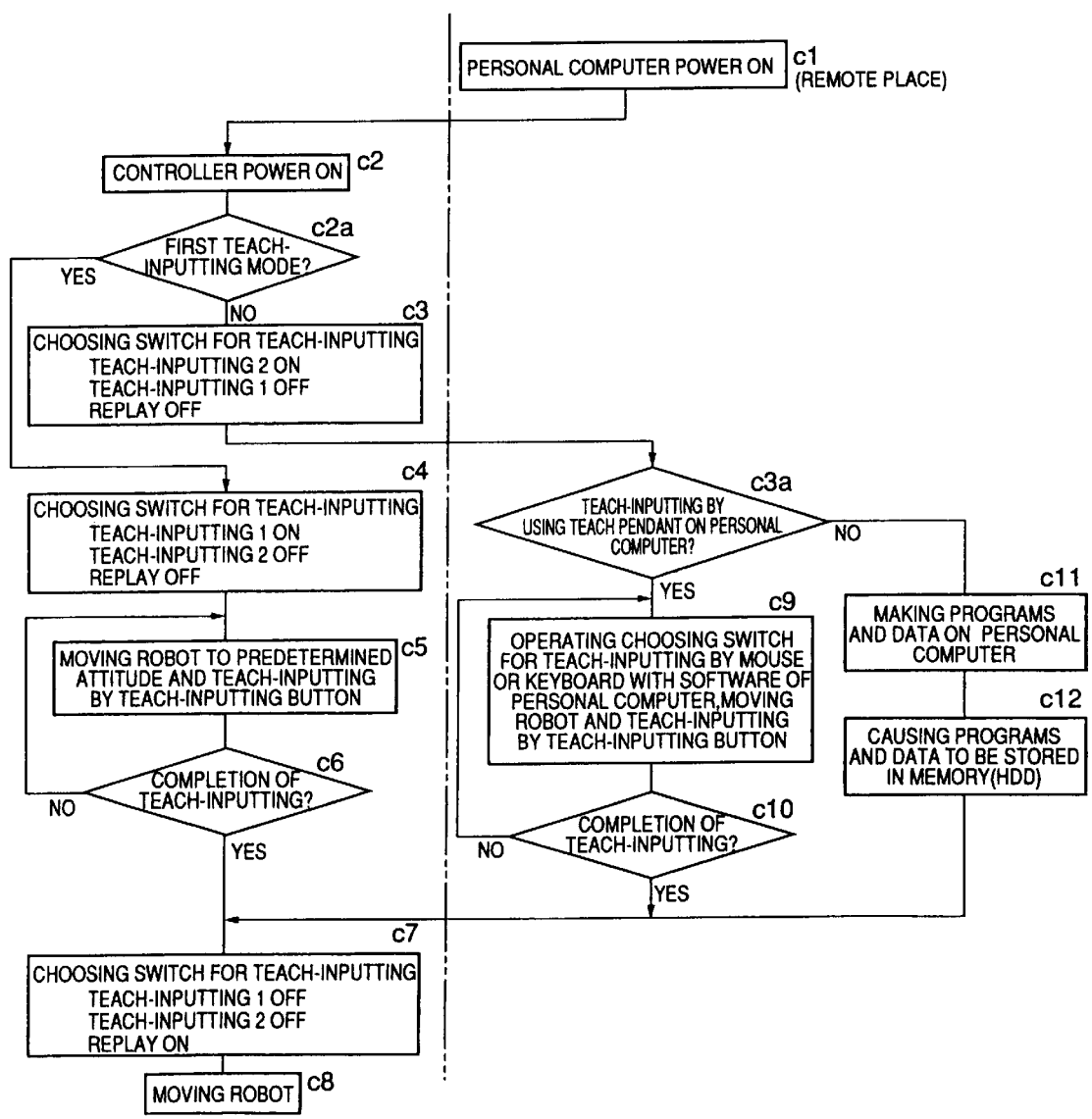
FIG. 8 is a flow chart for explaining an entire operation of the embodiment shown in FIGS. 1 to 7.

FIG. 8 is a flow chart for explaining an entire operation of the embodiment shown in FIGS. 1 to 7. The electric power is supplied to the second teach-inputting means 270 materialized by the personal computer at a step c1. Then, the electric power is also supplied to the controlling means 250. At a step c2, the electric power is supplied to the servo unit 260, the first teach-inputting means 230 and the robot body 210. At a step c2a, it is judged whether the first-teaching mode 242 is chosen by the choosing switch 240 disposed at the neighboring place of the robot body 210. When the first-teaching mode 242 is chosen, a step c4 is executed. That is, inputting operation of the teaching data with the key-inputting means 232 of the first teach-inputting means 230 is allowed, but inputting operation of teaching data with the second teach-inputting means 270 is forbidden. Replaying operation is also forbidden.

At a step c5, the operator at the neighboring place of the robot body 210 operates the key-inputting means 232 of the first teach-inputting means 230, to operate the joints JT1 to JT6 of the robot body 210 with the motors 218 while confirming with his eyes. Thus, the joints JT1 to JT6 are brought to their starting positions and attitudes, and the teaching data are inputted. The teaching data are transmitted to the processing circuit 251 of the controlling means 250 through the line 221, the communication controlling means 263 of the servo unit 260 and the optical fiber 258, by the processing circuit 231 of the first teach-inputting means 230. Then the teaching data are stored in the memory for teaching data 252.

When it is judged at a step c6 that the teaching operations with the first teach-inputting means 230 are completed, a step c7 is executed. At the step c7, the operator at the neighboring place of the robot body 210 turns the knob for operating 241 of the choosing switch 240 to switch the operational mode into the replaying mode 244. Thus, the processing circuit 251 in the controlling means 250 reads out the teaching data stored in the memory for teaching data 262, and transmits them to the processing circuit 262 via the optical fiber 258. The processing circuit 262 processes and calculates the teaching data, and drives and controls the motors 218 for the robot body 210. Thus, the movements of the robot body 210 are controlled at a step c8.

When the processing circuit 251 in the controlling means 250 judges at a step c2a that the second-teaching mode 243 is chosen and set by the choosing switch 240 disposed at the neighboring place of the robot body 210, the inputting operation of the teaching data with the first teach-inputting means 230 is forbidden and the operation for replaying mode 244 is also forbidden. At a step c3, the operator can operate the mouse 273 or keyboard 272 to input teaching data while looking at the displayed area for inputting 291 as described above with reference to FIG. 4. The choice of the mouse 273 or the keyboard 272 can be made by a switch provided at the keyboard 272. If the input operation with the mouse 273 is chosen, a step 9 is executed. That is, in the second teach-inputting means 270, as described above with reference to FIG. 5, the displayed area for inputting 291 is displayed on the screen 275 of the displaying means 271. The cursor 295 can be displaced freely by the mouse 273, and teaching data for the joints JT1 to JT6 are respectively inputted by the click-switch 296, as described above. The processing circuit 276 processes the inputted teaching data, and causes the displayed area 298 of the displaying means 271 (means for displaying the positions of the joints, means for displaying the image) to display the positions and attitudes of the joints JT1 to JT6 of the robot body 210 as a perspective view. The operator can confirm the teaching data by looking at the robot body 210 displayed in the displayed area 298. This prevents the operator from making an error in the teaching data. According to another embodiment of the invention, an image of the robot body 210 taken by the television camera 300 (taking means) as shown in FIG. 1 can be displayed in the displayed area 298.

After the input operation with the mouse 273 are completed at a step c10, a step c7 is executed. The teaching data are transmitted to the processing circuit 251 in the controlling means 250 by the processing circuit 276, and stored in the data-memory 252.

If the input operation with the keyboard 272 of the second teach-inputting means 270 is chosen at a step c3a, a step c11 is executed. That is, teaching data obtained by the operation with the keyboard 272 are stored in a memory 277. The memory 277 may be materialized by a hard disk. The teaching data made at the step c11 are stored and recorded in the memory 277 at the next step c12.

The second teach-inputting means 270 can have data inputting means 285 in which a floppy disk can be inserted removably. A storage device such as a floppy disk, which stores teaching data made by a personal computer disposed at other place or the like, is set in the data inputting means 285. The teaching data in the storage device removably set in the data inputting means 285 are read out by the processing circuit 276, and stored in the memory 252 by the processing circuit 251 in the controlling means 250.

Figure 9:
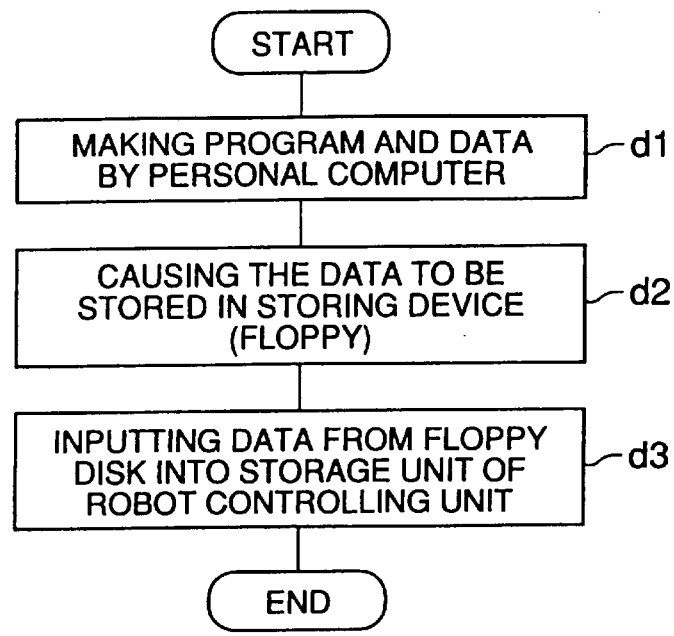
FIG. 9 is a flow chart for explaining an operation of a personal computer and the like for causing teaching data to be stored in a storage device such as a floppy disk set in the data inputting means 285 of the second teach-inputting means 270.
Figure 10A:
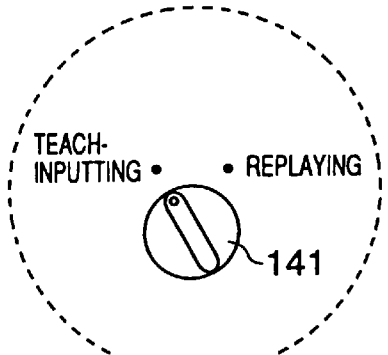
FIG. 10A is an enlargement of the choosing switch shown in FIG. 10.
Figure 10:
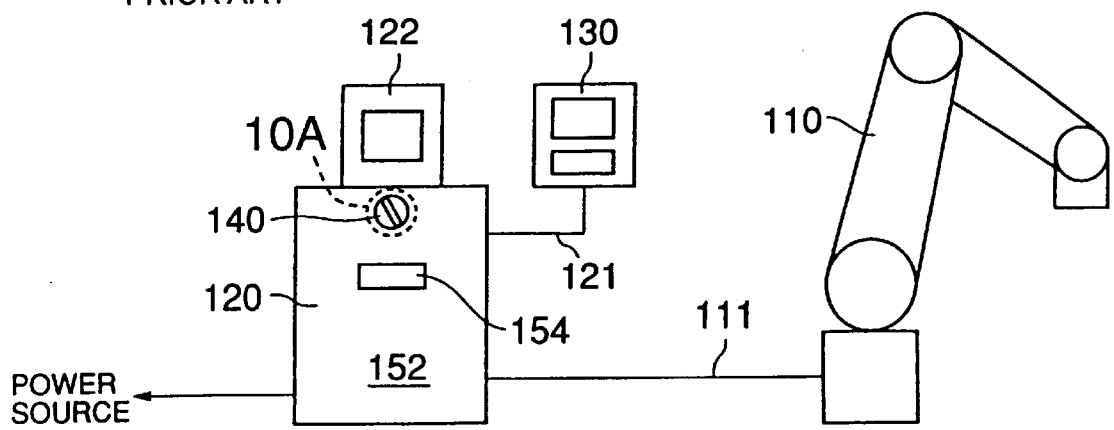
FIG. 10 is a schematic view of a typical prior art.
Figure 11:
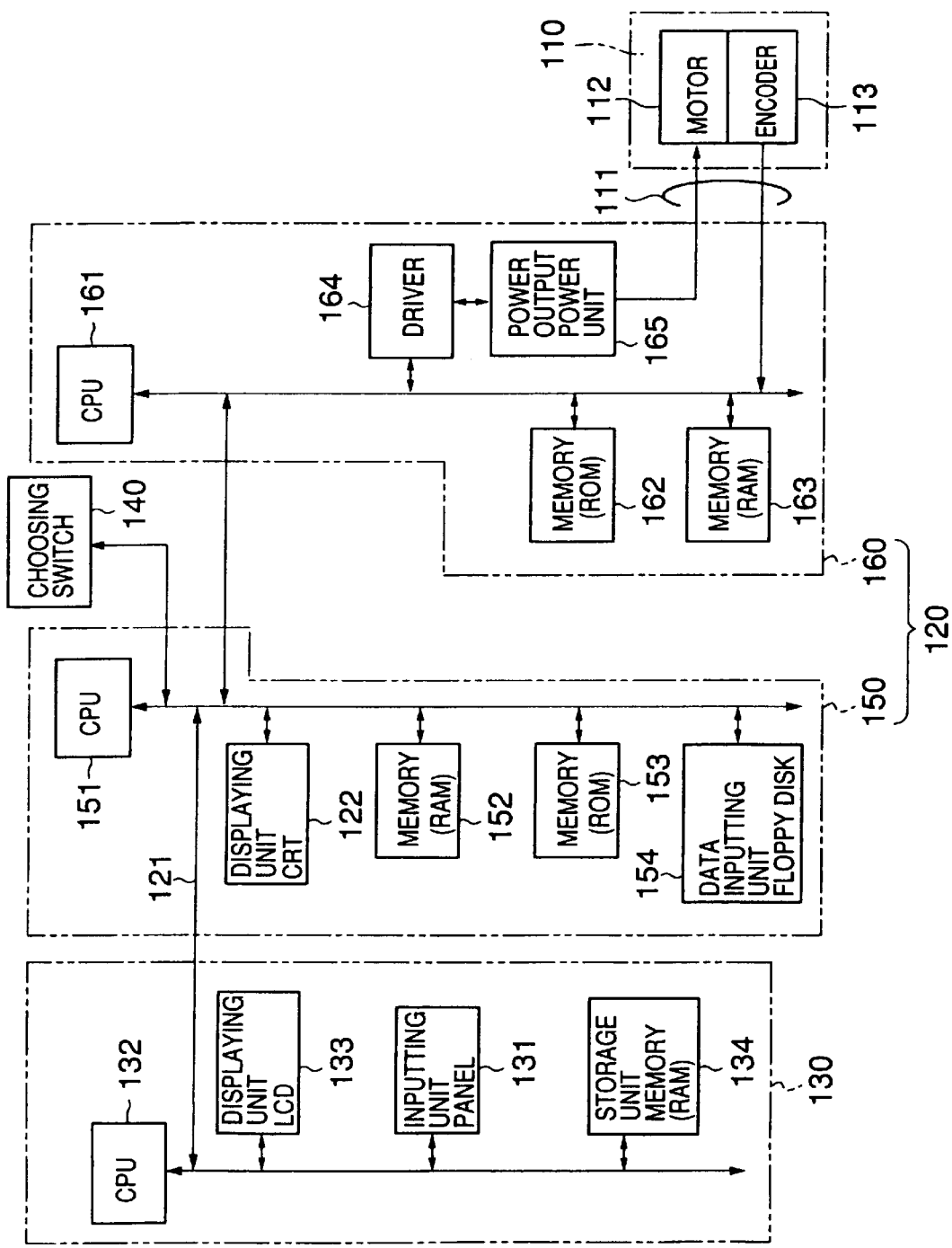
FIG. 11 is a block diagram showing an electrical structure of the prior art shown in FIG. 10.
Figure 12:
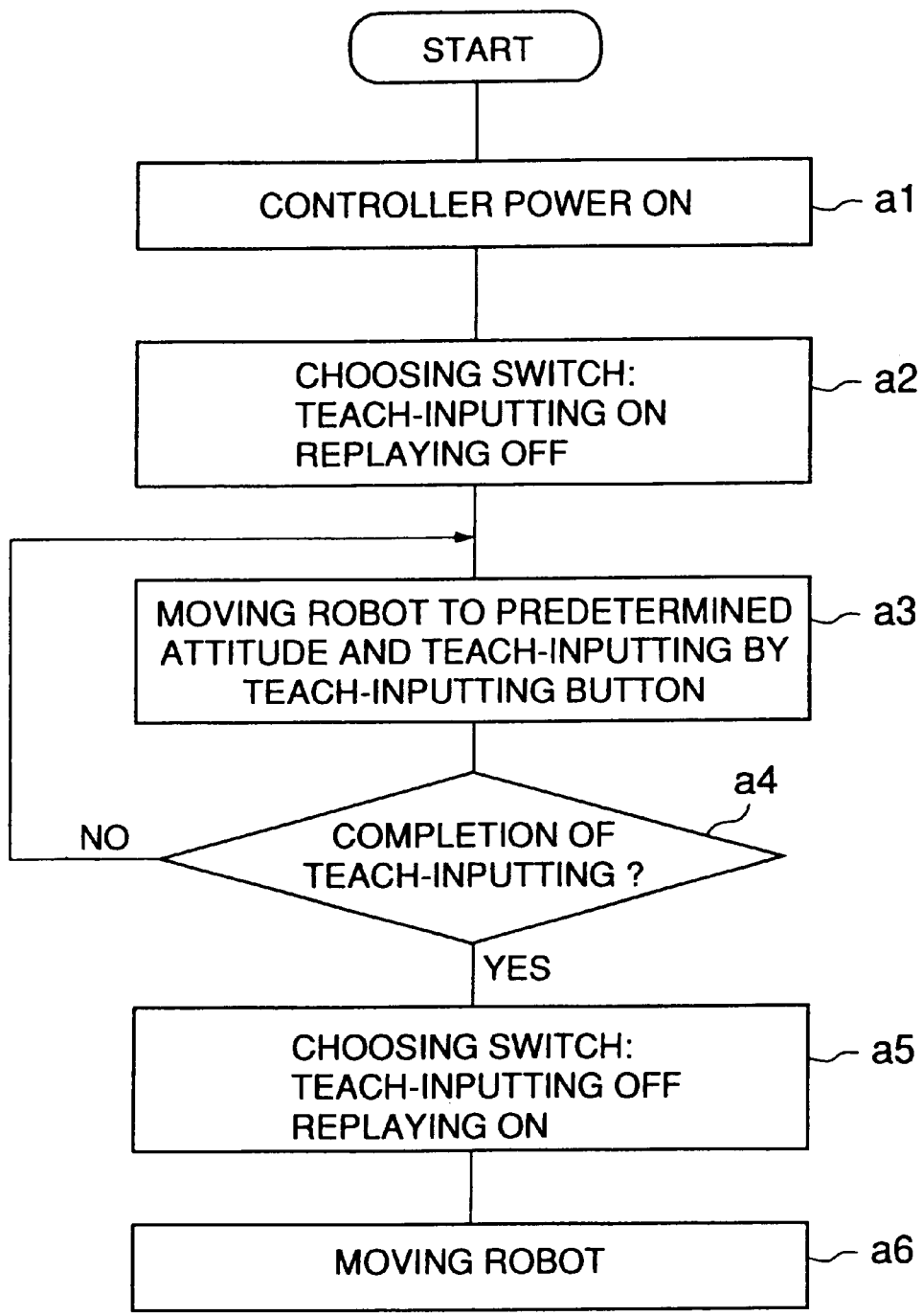
FIG. 12 is a flow chart for explaining an entire operation of the prior art shown in FIGS. 10 and 11.
Figure 13:
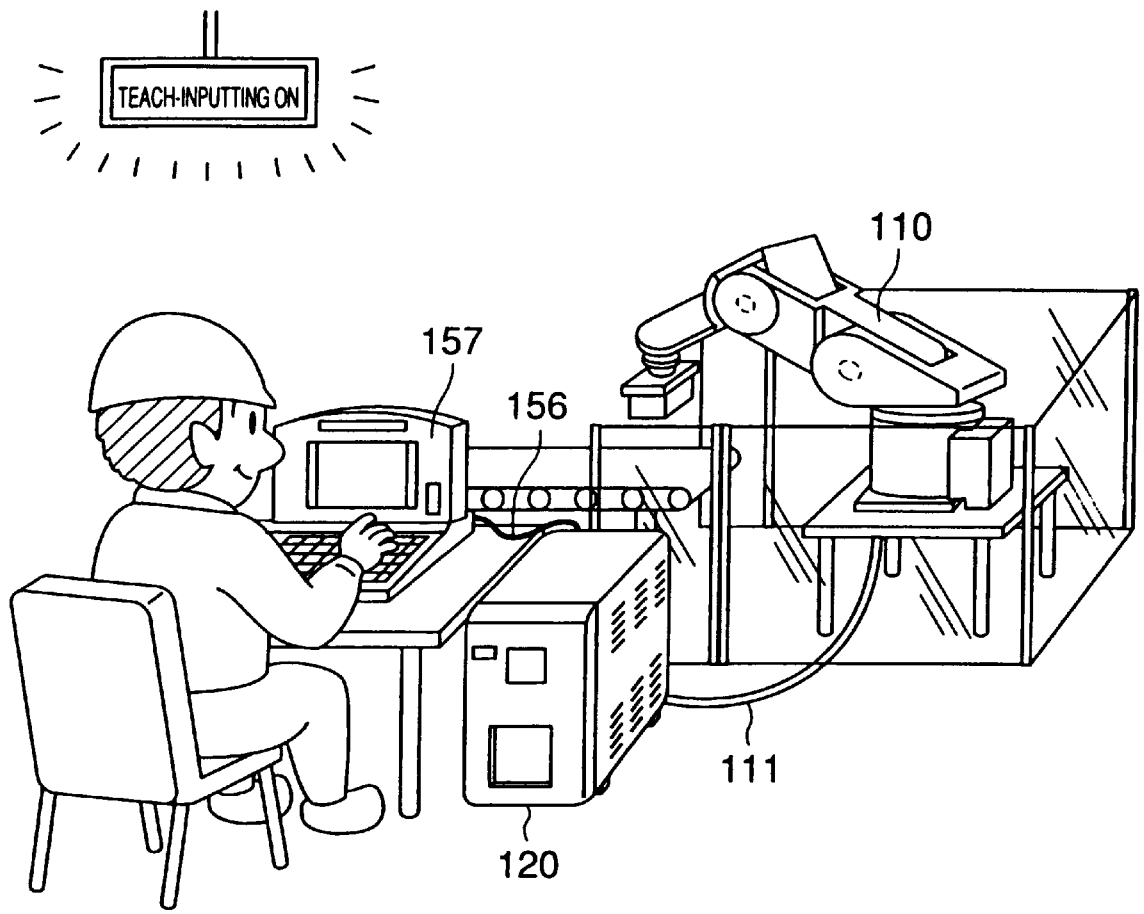
FIG. 13 is a schematic perspective view of another prior art.

FIG. 9 is a flow chart for explaining an operation of a personal computer and the like for causing teaching data to be stored in a storage device such as a floppy disk set in the data inputting means 285 of the second teach-inputting means 270. At a step d1, teaching data as program data are made by the personal computer. At the next step d2, the teaching data made at the step d1 are transmitted to a storage device such as a floppy disk and stored therein. At a step d3, the storage device is taken away from the personal computer, and inserted into the data inputting means 285 in the second teach-inputting means 270. Then the teaching data are stored in the memory 252 as described above.

According to another embodiment of the invention, teaching data can be inputted not by the image of the displayed area for inputting 291 on the screen 275 in the displaying means 271 and the operation of the cursor 275 of the mouse 273, but by the operations to predetermined switches or plural keys provided at the keyboard 272. The teaching data inputted by the keyboard 272 are stored in the memory 252 in the same manner as described above.

According to another embodiment, the first teach-inputting means 230, the servo unit 260, the choosing switch 240 and the controlling means 250 are provided for each of the robot bodies 210, and the plural controlling means 250 choose software programs in the memory 277 for the processing circuit 276 of the second teach-inputting means 270.

According to another embodiment, one controlling means 250 may be common for plural robot bodies 210, and the first teach-inputting means 230, the servo unit 260 and the choosing switch 240 may be provided for each of the robot bodies 210. The optic-electric signal converting means 261 for each of the robot bodies 210 may be connected to the common optic-electric signal converting means 255.

According to the invention, the operator can input teaching data by the operation to the first teach-inputting means while looking at the movement of the robot body, at the neighboring place where the robot body is disposed. In addition, the operator can input teaching data by the operation to the second teach-inputting means to operate the robot body, at the remote place. Thus, not only during the operation with the first teach-inputting means at the neighboring place, but also during the operation with the teach-inputting means at the remote place, the operator can confirm the movements of the joints of the robot body. Therefore, it is assured to eliminate the error in inputting the teaching data, and it is not necessary for the operator to input the teaching data at the environmentally polluted neighboring place where the robot body is disposed. In addition, the risks caused by undesired movements of the robot body are reduced, and the safety measure for the operator is assured.

According to the invention, the choosing means, which allow the input operation with exclusively either of the first teach-inputting means and the second teach-inputting means, is disposed at the neighboring place of the robot body. When an operator is at the neighboring place, the choosing means is set in such a manner that the teaching operation with the first teach-inputting means is allowed but the teaching operation with the second teach-inputting means is forbidden. This removes risks for the operator at the neighboring place, which risks may be caused by the movements of the robot body following the input operation with the second teach-inputting means, so that a safety for the operator at the neighboring place is assured.

According to the invention, the robot body displaying means display the positions and the attitudes of the joints of the robot body, during the input operation with the second teach-inputting means. Thus, the operator to the second teach-inputting means can confirm the position, the attitude or the like of the robot body, by the robot body displaying means in a visual or an auditory manner. Therefore, it is assured to eliminate the error in inputting the teaching data.

According to the invention, the robot body displaying means can display the positions of the joints of the robot body which are obtained by processing the teaching data from the second teach-inputting means. Thus, the operator for the second teach-inputting means can confirm the positions and the attitudes of the joints of the robot body.

According to the invention, the image of the robot body is taken by taking means such as a television camera, and the operator for the second teach-inputting means at the remote place can confirm the teaching data by looking at the image of the robot body displayed by the displaying means disposed close to the second teach-inputting means. Therefore, it is assured to eliminate the error in inputting the teaching data.

According to the invention, the joints of the robot body can remain stopped while the teach-inputting operation is executed with the second teach-inputting means. In the case, the teaching data are inputted and stored in substantially the same manner as the prior art.

According to the invention, the second teach-inputting means may consist of: input-operating means; displaying means; and a teach-input processing circuit. The operator can input the teaching data while looking at information about the teaching data inputted by the input-operating means such as the teaching data themselves or an image or view of the entire robot body showing the positions and the attitudes of the joints of the robot body which are obtained by processing the teaching data. The teaching data inputted by the second teach-inputting means can be stored in the memory for teaching data by the robot-control processing circuit.

According to the invention, the second teach-inputting means can be easily materialized by a personal computer. The robot-control processing circuit can be easily materialized by a board mounted on the circuit board which can be set in the housing of the personal computer in a bus-connection manner. This makes the entire construction compact. In addition, this can meet a recent requirement that the teaching data for the robot be preferably made by a personal computer on the market.

According to the invention, the servo unit connected to the robot body via plural electric signal lines is disposed at the neighboring place where the robot body is disposed i.e. at the real-operating site. The servo unit is connected to the robot-control processing circuit disposed at the remote place via the optical fiber. For example, the remote place is away from the real-operating site by about 2 km. Thus, the input operation with the second teach-inputting means can be executed at an office which is remote from the real-operating site.

According to the invention, the second teach-inputting means may have the joint-designating area and the record area displayed by the mouse input displaying means. When the mouse is clicked at the above areas, teaching data are made. Then, the inputting operation can be made easier.

The displaying means for displaying the information about the teaching data by the second teach-inputting means and the mouse input displaying means can be materialized by one liquid-crystal screen or one cathode-ray tube screen in such a manner that areas displayed by the two means are separated. This can make the construction compact.

What is claimed is:

1. A robot control unit for controlling a robot body with a plurality of joints, comprising;
   a servo unit for respectively driving the joints of the robot body, in response to an instructing signal sent thereto,
   first teach-inputting means disposed at a neighboring place where an operator can directly see the robot body, for making teaching data for positions of the joints of the robot body by operating thereto,
   second teach-inputting means disposed at another remote place where an operator can not directly see the robot body, for making teaching data for positions of the joints of the robot body by operating thereto,
   choosing means connected to the first teach-inputting means and the second teach-inputting means, for choosing the teaching data made by either the first teach-inputting means or the second teach-inputting means, and
   controlling means connected to the choosing means and the servo unit, having a memory for teaching data, for transmitting the teaching data chosen by the choosing means to the servo unit as the instruction signal, and for causing the teaching data to be stored in the memory for teaching data.

2. A robot control unit according to claim 1, wherein:
   the second teach-inputting means is provided with robot body displaying means which display the positions of the joints of the robot body.

3. A robot control unit according to claim 2, wherein:
   the robot body displaying means calculates driven and controlled positions of the joints of the robot body following the teaching data chosen by the choosing means, and displays the calculated positions.

4. A robot control unit according to claim 2, wherein:
   the robot body displaying means calculates driven and controlled positions of the joints of the robot body following the teaching data made by the second teach-inputting means, and displays the calculated positions.

5. A robot control unit according to claim 2, wherein:
   the robot body displaying means has: detecting means disposed at the neighboring place, for detecting the positions of the joints of the robot body; and displaying means disposed at a place near to the second teach-inputting means, for displaying the positions of the joints of the robot body detected by the detected means.

6. A robot control unit according to claim 5, wherein:
   the robot body displaying means has: taking means disposed at the neighboring place, for taking a image of the robot body; and displaying means disposed at a place near to the second teach-inputting means, for displaying the image of the robot body taken by the taking means.

7. A robot control unit according to claim 1, wherein:
   the second teach-inputting means is materialized by a personal computer.

8. A robot control unit according to claim 1, wherein:
   the servo unit is disposed at the neighboring place, and is connected to the control means via an optical fiber.

9. A robot control unit according to claim 1, wherein:
   one of the first teach-inputting means and the second teach-inputting means has: a mouse which can be clicked for an operation; and mouse input displaying means, having a screen showing a joint-designating area representing the plural joints of the robot body and a record area,
   raw data are made in such a manner that the corresponding joint shifts by a predetermined shifting unit every when the mouse is clicked at the joint-designating area, and
   the raw data made by then are outputted as the teaching data when the mouse is clicked at the record area.

10. A robot control unit according to claim 1, wherein:
    the choosing means is also connected to the memory for teaching data, and
    the teaching data stored in the memory for teaching data can be also chosen by the choosing means.

11. A robot control unit according to claim 1, wherein:
    the controlling means transmits the teaching data chosen by the choosing means to the servo unit as the instruction signal.

12. A robot control unit according to claim 11, wherein:
    the robot body displaying means calculates driven and controlled positions of the joints of the robot body following the teaching data chosen by the choosing means, and displays the calculated positions.

13. A robot control unit according to claim 11, wherein:
    the robot body displaying means calculates driven and controlled positions of the joints of the robot body following the teaching data made by the second teach-inputting means, and displays the calculated positions.

14. A robot control unit according to claim 11, wherein:
    the robot body displaying means has: detecting means disposed at the neighboring place, for detecting the positions of the joints of the robot body; and displaying means disposed at a place near to the second teach-inputting means, for displaying the positions of the joints of the robot body detected by the detected means.

15. A robot control unit according to claim 14, wherein:

the robot body displaying means has: taking means disposed at the neighboring place, for taking a image of the robot body; and displaying means disposed at a place near to the second teach-inputting means, for displaying the image of the robot body taken by the taking means.

16. A robot control unit for controlling a robot body with a plurality of joints, comprising;

a servo unit for respectively driving the joints of the robot body, in response to an instructing signal sent thereto, first teach-inputting means disposed at a neighboring place where an operator can directly see the robot body, for making teaching data for positions of the joints of the robot body by operating thereto, second teach-inputting means disposed at another remote place where an operator can not directly see the robot body, for making teaching data for positions of the joints of the robot body by operating thereto, robot body displaying means provided in the second teach-inputting means, for displaying the positions of the joints of the robot body, choosing means connected to the first teach-inputting means and the second teach-inputting means, for choosing the teaching data made by either the first teach-inputting means or the second teach-inputting means, controlling means connected to the choosing means and the servo unit, having a memory for teaching data, for causing the teaching data chosen by the choosing means to be stored in the memory for teaching data.

17. A robot control unit according to claim 16, wherein:

the second teach-inputting means is materialized by a personal computer.

18. A robot control unit according to claim 16, wherein:

the servo unit is disposed at the neighboring place, and is connected to the control means via an optical fiber.

19. A robot control unit according to claim 16, wherein:

one of the first teach-inputting means and the second teach-inputting means has: a mouse which can be clicked for an operation; and mouse input displaying means, having a screen showing a joint-designating area representing the plural joints of the robot body and a record area, raw data are made in such a manner that the corresponding joint shifts by a predetermined shifting unit every when the mouse is clicked at the joint-designating area, and the raw data made by then are outputted as the teaching data when the mouse is clicked at the record area.

20. A robot control unit according to claim 11, wherein:

the choosing means is also connected to the memory for teaching data, and the teaching data stored in the memory for teaching data can be also chosen by the choosing means.

\* \* \* \* \*